United States Patent
Dalke et al.

(10) Patent No.: US 12,395,516 B1
(45) Date of Patent: Aug. 19, 2025

(54) PROVIDING OBFUSCATED RESULTS TO A NETWORK SCANNER

(71) Applicant: Rapid7, Inc., Boston, MA (US)

(72) Inventors: Landon Dalke, Meridian, ID (US); Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 287 days.

(21) Appl. No.: 18/203,111

(22) Filed: May 30, 2023

(51) Int. Cl.
H04L 9/40 (2022.01)

(52) U.S. Cl.
CPC ...... H04L 63/1433 (2013.01); H04L 63/1408 (2013.01); H04L 63/1483 (2013.01)

(58) Field of Classification Search
CPC ............. H04L 63/1433; H04L 63/1408; H04L 63/1483
See application file for complete search history.

(56) References Cited

U.S. PATENT DOCUMENTS

| | | | |
|---|---|---|---|
| 6,954,775 B1 | 10/2005 | Shanklin et al. | |
| 7,516,487 B1 | 4/2009 | Szeto et al. | |
| 9,215,244 B2 | 12/2015 | Ayyagari et al. | |
| 9,350,748 B1 * | 5/2016 | McClintock | H04L 63/1491 |
| 9,413,616 B2 | 8/2016 | Nguyen et al. | |
| 10,084,598 B2 | 9/2018 | Alexander et al. | |
| 10,212,147 B2 | 2/2019 | Buendgen et al. | |
| 10,298,598 B1 * | 5/2019 | McClintock | H04L 63/1483 |
| 10,375,103 B1 * | 8/2019 | Brandwine | H04L 63/0236 |
| 11,507,860 B1 * | 11/2022 | Hodgman | H04L 63/1425 |
| 2008/0184344 A1 * | 7/2008 | Hernacki | G06F 21/31 726/4 |
| 2010/0113952 A1 | 5/2010 | Raguin et al. | |
| 2017/0034166 A1 * | 2/2017 | Sonoda | G06F 21/44 |
| 2018/0048665 A1 * | 2/2018 | Shulman | H04L 63/1425 |
| 2018/0144123 A1 * | 5/2018 | Levin | G06F 21/566 |
| 2020/0097665 A1 * | 3/2020 | Mahaffey | G06F 21/577 |

FOREIGN PATENT DOCUMENTS

| | | | | |
|---|---|---|---|---|
| CN | 110830457 A | * | 2/2020 | ......... H04L 63/0227 |
| CN | 110912898 A | * | 3/2020 | ......... H04L 63/1441 |
| CN | 111131293 A | * | 5/2020 | ......... G06Q 30/0185 |
| CN | 114629667 A | * | 6/2022 | |
| CN | 114826663 A | * | 7/2022 | |
| CN | 117997569 A | * | 5/2024 | |
| CN | 118138312 A | * | 6/2024 | ......... G06F 18/2431 |
| WO | WO-2023021499 A1 | * | 2/2023 | ........... G06F 21/552 |
| WO | WO-2024033847 A1 | * | 2/2024 | ........... G06F 21/577 |

* cited by examiner

*Primary Examiner* — Sarah Su

(74) *Attorney, Agent, or Firm* — Ashwin Anand; Lei Sun

(57) ABSTRACT

As an example, an asset receives a request from a scanner performing a reconnaissance of a network that includes the asset. The asset sends a response acknowledging receiving the request, indicating that the asset is alive. The asset receives port scan requests associated with ports of the asset. The asset creates fake fingerprints that include incorrect information about ports of the asset. The asset sends the fake fingerprints to the scanner in response to the port scan requests. The asset determines that a scan engine is requesting access to the asset via a particular port of the asset. The asset grants the scan engine access to the asset via the particular port to enable the scan engine to gather asset data associated with the asset for analysis.

20 Claims, 9 Drawing Sheets

PROVIDING OBFUSCATED RESULTS TO A NETWORK SCANNER

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g., data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network using a variety of interactive means, in order to steal sensitive information from the company or even gain control of the company's computing systems. As a result, enterprise security systems have become increasingly important to protect company networks against these types of vulnerabilities.

One of the first things that a malicious actor trying to attack and gain access to a corporate (e.g., enterprise) network does is to perform reconnaissance ("recon") of the targeted network. Rather than guessing, the attacker performs recon to identify network vulnerabilities, e.g., locations to which the attacker can quickly and easily gain access. The attacker may use a scan tool, such as NMAP, to scan the enterprise network to identify potential locations that can be used to gain access to the network. Making it difficult for an attacker to determine network vulnerabilities may help make a network more secure and reduce the possibility of unauthorized personnel, such as a malicious actor, gaining access to the network.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

An asset (e.g., a computing device, a server, a switch, a router, or the like) in a private network includes one or more processors and one or more non-transitory computer readable media storing instructions executable by the one or more processors to perform various operations. The asset receives a request from a scanner. The scanner may be associated with a malicious actor that is performing a reconnaissance of the assets in the private network. The asset sends a response to the scanner acknowledging receiving the request. The response indicates to the scanner that an internet protocol (IP) address of the asset is alive. The asset receives one or more port scan requests associated with one or more ports of the asset. The one or more port scan requests are sent by the scanner. The asset creates one or more fake fingerprints. Individual fake fingerprints of the one or more fake fingerprints correspond to individual ports of the one or more ports of the asset. The individual fake fingerprints include incorrect information about individual ports. The asset sends the one or more fake fingerprints to the scanner in response to the one or more port scans. The asset determines that a scan engine (e.g., authorized to perform a scan of the assets in the private network to identify vulnerabilities) is requesting access to the asset via a particular port of the one or more ports of the asset. The asset grants the scan engine access to the asset via the particular port either by (1) authenticating credentials presented by the scan engine or (2) creating a trusted secure channel with the scan engine using elliptic curve asymmetric encryption (ECDSA) and advanced encryption standard (AES). The asset provides asset data associated with the asset to the scan engine via the particular port.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
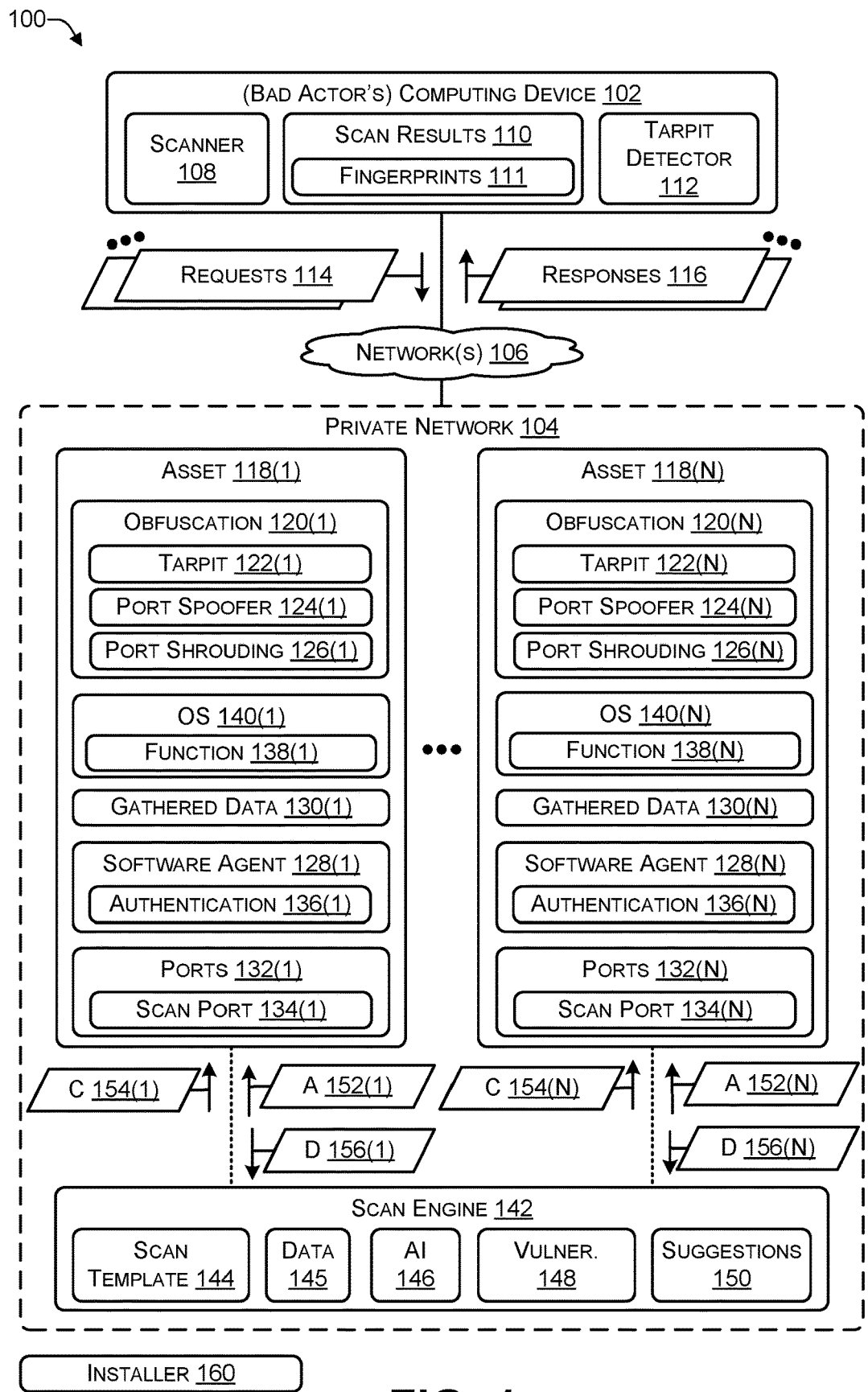
FIG. 1 is a block diagram of a system that includes a computing device of a bad actor scanning an enterprise having multiple assets, according to some embodiments.

The systems and techniques described herein (1) use multiple techniques to make it difficult for a malicious actor to obtain network vulnerability information via a reconnaissance ("recon") scan while (2) enabling an authorized scan engine to obtain network vulnerability information. The systems techniques use a tarpit, port spoofing, port shrouding, or any combination thereof to make it difficult for the malicious actor to obtain vulnerability information using a recon scan. The systems and techniques may install a software agent on each asset (e.g., a computer, a router, a switch, or the like) in the network and designate a port on each asset for the authorized scan engine to use. The authorized scan engine uses a scan template that includes the designated port on each asset to scan the network and obtain data that is analyzed to identify potential vulnerabilities. In some cases, the software agent may be Insight Agent or Scan Assistant from Rapid7®.

Multiple techniques are used to make it difficult for a malicious actor to obtain network vulnerability information via a reconnaissance ("recon") scan. First, when assets in a network are scanned, the systems and techniques use shrouding to provide information (e.g., in response to a scan) that is not useful to the attacker. For example, performing a scan of 255 IP addresses in a system provides obfuscated information, e.g., all internet protocol (IP) addresses scanned appear to respond to the scan and all indicate they are active, even though a handful of IP addresses are actually active. In this way, the scan does not yield any useful information to an attacker. In some cases, the systems and techniques may cause the scan results to provide incorrect ("spoofed") information about assets in the network. For example, the systems and techniques may cause all ports of an asset may be shown as active, even though only a few of the ports are actually active. As another example, the systems and techniques may cause each asset to be shown as having different characteristics (e.g., operating system) than the asset actually has. For example, an asset running a Microsoft® operating system (OS) may show up in a scan as running a different OS (e.g., Linux, Apache, or the like), from a fingerprinting point of view.

Normally (e.g., if the systems and techniques described herein are not used), a port scan on a network reveals which ports are open and listening (receiving information) as well as revealing the presence of security devices, such as firewalls, that are present between the sender and the target, a process referred to as fingerprinting. The ports of an asset are numbered from 0 to 65535 and each port may provide a different service. Ports 0 to 1023 are standard ports and are assigned particular services by the Internet Assigned Numbers Authority (IANA). For example, IANA has assigned Port 20 to provide User Datagram Protocol (UDP), including File Transfer Protocol (FTP) for data transfer, Port 22 to provide transmission control protocol (TCP), including Secure Shell (SSH) protocol for secure logins, FTP, and port forwarding, Port 23 (TCP) to provide Telnet protocol for unencrypted text commutations, Port 53 (UDP) to provide Domain Name System (DNS) to translate the names of computers, Port 80 (TCP) to provide World Wide Web hypertext transfer protocol (HTTP), and so on. The systems and techniques described herein cause a scan of the ports (e.g., from 0 to 65535) to receive a response (e.g., a fake fingerprint) from each port, creating what is referred to as a tarpit. The systems and techniques cause fingerprinting to take days or even months rather than a few minutes (as in a conventional system). Some parameters within the TCP protocol definition are left up to the implementation. Different operating systems, and different versions of the same operating system, may set different defaults for these values. The fingerprint enables differentiating between various operating systems, operating system versions, and TCP/IP implementations.

Thus, the systems and techniques use shrouding, fingerprinting, or any combination thereof to make it difficult for a malicious actor to identify network vulnerabilities to exploit to gain access to a network. However, the systems and techniques may render a network scanner, such as InsightVM® from Rapid7®, that an enterprise uses to identify potential vulnerabilities, ineffective. To address this issue, each asset in the network may be configured in a way that a particular port of each asset is designated as an access port for the network scanner (also known as a scan engine). In this way, the scan engine is able to gain access to each asset in the network using the particular port. A software agent (e.g., a Scan Assistant, Insight Agent, or another agent) installed on the asset monitors the particular port. To prevent unauthorized access, the scan engine is authenticated by the software agent before the scan engine is allowed to access information about the asset (e.g., by performing a scan of the asset to identify potential vulnerabilities). For example, the scan engine may access the particular port and present credentials, which the software agent authenticates, before the scan engine is able to access the asset. The scan engine may use a specialized scan template that looks for one particular port on each device. The particular port may vary from one asset to another, e.g., a first asset may have a first particular port, a second asset may have a second particular port that is different from the first particular port and so on. The software used to generate the shrouding includes an exception that causes the particular port of each asset to be fingerprinted correctly. In some cases, the scan engine may request information from the software agent. For example, the software agent may periodically (e.g., at a predetermined time interval) perform a scan of the asset for potential vulnerabilities, suspicious activity, and the like and stores the gathered data. In such cases, the scan engine may ask the software agent to provide the gathered data (e.g., which ports are actually open). The software agent is able to provide information about what is "real" about the asset (e.g., which ports are actually open) to enable the scan engine to ignore the spoofed/obfuscated data created by shrouding and the tarpit.

The systems and techniques described herein may introduce "noise" (e.g., tarpit) that causes a scan to take an excessive amount of time. The tarpit is used to slow down a malicious actor by making it appear as though all ports of an asset are active when only a handful of ports are actually active. For example, a tarpit may cause an asset to automatically send an acknowledgement (e.g., SYN ACK packet) in response to any incoming requests (e.g., SYN packets). This not only simulates that all ports are open, which causes the scan to take much longer, but it simulates that all assets are alive and responding. The systems and techniques may use fingerprint spoofing (e.g., using a port spoofer) to further increase how long a scan takes and to provide incorrect information to the malicious actor. Port Spoofing involves simulating different protocols and/or services (e.g., SSH/OpenSSH) on scanned ports. The systems and techniques may use shrouding to provide incorrect information about the ports, such as showing an incorrect operating system and the like. Shrouding involves providing a scan with fake scan results, thereby hiding real asset data in fake asset data.

Scanning assets in a tarpit may (i) significantly slow an attacker and (ii) cause the scan results to be worthless and causing issues for sophisticated attackers. For example, a sophisticated attacker may use a tarpit detection protocol that detects a tarpit and stops the scan. Typically, such a protocol is used after the asset/port scan, so the attacker has to wait for the bad data resulting from the port scan before initiating a tarpit detection protocol. In some cases, the tarpit detection may be performed at the fingerprinting stage. For example, if there are three failed fingerprints in a row, the malicious actor's scanner may assume that the network has a tarpit and stop the scan. During a network scan, most of the time is spent fingerprinting. By combining a tarpit with a port spoofer, the systems and techniques described herein provide legitimate looking fingerprints for the ports, which means that the malicious actor's scanner does not detect a tarpit and just continues to scan for a very long time (e.g., months), depending on the number of assets and the number of ports per asset that are being scanned.

To enable legitimate network security products (e.g., Rapid7® InsightVM®) to perform network scans, a scan engine is able to bypass scanning an asset for ports/fingerprint by directly accessing the asset and obtaining the appropriate information (e.g., fingerprints, vulnerability information, and the like) from a software agent installed on the asset itself. In this way, the scan engine is able to avoid triggering the obfuscation mechanisms (e.g., tarpit, shrouding, port spoofing). In some cases, a local function provided by the OS, similar to the Windows® command netstat, may be used by the software agent and/or the scan engine to obtain information about the asset (e.g., information about open ports and the like).

A tarpit function responds to a network-based scan by providing an SYN-ACK to all SYN requests. Thus, even if there are a few hosts within a particular subnet, all the hosts report and so appear to be active, even though the majority are not. If a scan is done against all 65 k ports of an asset, all 65 k ports respond to the scan and appear as if they are open, even though a few ports are actually open. A port spoof takes this one step further because not only does the scan show that all 65 k appear to be open ports, the scanner receives fake fingerprints that look real. Thus, at the fingerprint phase, the scanner will attempt to fingerprint all 65 k ports. Fingerprinting is the hardest and longest process in a scan, which means that fingerprinting 65 k open ports with valid fingerprints (even though they are fake), may take months (or even years) to complete. A further obfuscation is to simulate protocols. For example, each fingerprint may be modified to appear as though a particular OS (e.g., Microsoft® Windows®) is present on all assets when at least some assets are using another OS (e.g., Linux). In some cases, each fingerprint may be modified to indicate a first OS is present when a second OS is actually present (e.g., fingerprint shows Windows® when asset runs Linux or fingerprint shows Linux when asset runs Windows®). For example, using port spoofing and shrouding, each asset in the network may respond indicating that the same particular port (e.g., port 139) is open and provide a fingerprint indicating the same particular OS (e.g., a Microsoft® Windows®). In this way, the scan results show all assets as running the particular OS (e.g., Windows®), even when some assets are running a different OS (e.g., Linux, Cisco®, Apple® OS, or the like). Thus, even if the attacker waits for the results or limits the scan to just a few assets and a few ports, the results include fake information that makes it difficult for the attacker to mount an attack. To cut through the "noise" generated by the tarpit, port spoofer, and shrouding, a function (e.g., API) may be added to collect output from a command/shell utility (e.g., netstat or equivalent) and/or collect port data via other internal/local system APIs (e.g., similar to how netstat gathers data but without using netstat). The scan engine may use the data collected via the function for OS fingerprinting, protocol/service fingerprinting, vulnerability assessments, policy assessments, determining other types of information, or any combination thereof. The function enables the scan engine to scan all valid (e.g., actual) listening ports of each asset. The scan engine may use a customized scan template that looks for a designated port (e.g., TCP port 21047) on each asset.

Thus, when a malicious actor attempts to scan a network to identify network vulnerabilities, the systems and techniques described herein use a tarpit, a port spoofer, and network shrouding to increase the time taken by the scan and to provide obfuscated information that does not provide the malicious actor with actionable vulnerability information. In addition, the systems and techniques enable a scan engine of an enterprise to continue to scan the network and identify potential vulnerabilities. A software agent is installed on each asset in the network and a port on each asset is provided for the scan engine to use. The scan engine has a list of the ports to access on each asset. The scan engine uses the designated port to access the asset and the software agent verifies the credentials of the scan engine before enabling the scan engine to access (e.g., scan) the asset. In some cases, the asset may periodically perform a scan of the asset to gather vulnerability data. After the software agent verifies the scan engine's credentials, the software agent may provide the scan engine with access to the gathered data. In this way, the software agent performs the scan of the asset, enabling the scan engine to quickly obtain the scan results without the scan engine performing a scan of the asset. The scan engine may review the data gathered by the software agent and, if the data indicates one or more anomalies, the scan engine may obtain additional information (e.g., using a deeper level scan of the asset) before accessing a next asset in the network.

As a first example, a method includes receiving, by one or more processors of an asset in a private network, a request from a scanner. For example, the asset may include at least one of: a computing device, a server, a network switch, a router, or any combination thereof. The method includes sending, by the one or more processors, a response to the scanner acknowledging receiving the request. For example, the request may include a SYN request and the response may include a SYN-ACK. The method includes receiving, by the one or more processors, one or more port scan requests associated with one or more ports of the asset. The one or more port scan requests are sent by the scanner. The method includes creating, by the one or more processors, one or more fake fingerprints. Individual fake fingerprints of the one or more fake fingerprints correspond to individual ports of the one or more ports of the asset. The individual fake fingerprints include incorrect information about individual ports. For example, the fake fingerprint may indicate: (i) a different operating system than the operating system executing on the asset, (ii) a particular port of the one or more ports is open, regardless of whether the particular port is open or not, (iii) a different service than the service being provided at the particular port, or (iv) any combination thereof. The method includes sending, by the one or more processors, the one or more fake fingerprints to the scanner in response to the one or more port scans. The method includes determining, by the one or more processors, that a scan engine is requesting access to the asset via a particular port of the one or more ports of the asset. The method includes, based at least in part on authenticating, by the one or more processors, credentials presented by the scan engine, granting the scan engine access to the asset via the particular port. The method includes providing, by the one or more processors, asset data associated with the asset to the scan engine via the particular port. The scan engine analyzes the asset data using artificial intelligence (AI) to predict one or more vulnerabilities associated with the asset. For example, the artificial intelligence may be based on a support vector machine, an unsupervised clustering algorithm, or an artificial neural network algorithm. The artificial intelligence may be trained using: a plurality of vulnerabilities and one or more characteristics of individual vulnerabilities of the plurality of vulnerabilities.

As a second example, an asset includes one or more processors and one or more non-transitory computer readable media storing instructions executable by the one or more processors to perform various operations. The operations include receiving a request from a scanner. The asset is located in a private network. The operations include sending a response to the scanner acknowledging receiving the request. The response to the scanner acknowledging receiving the request may indicate that the asset is alive regardless of whether the asset is actually alive. The operations include receiving one or more port scan requests associated with one or more ports of the asset. The one or more port scan requests are sent by the scanner (e.g., as part of a recon of the private network). The operations include creating one or more fake fingerprints. Individual fake fingerprints of the one or more fake fingerprints correspond to individual ports of the one or more ports of the asset. The individual fake fingerprints include incorrect information about individual ports of the one or more ports of the asset. For example, the individual fake fingerprints of the one or more fake fingerprints may indicate that every port of the one or more ports is open (e.g., regardless of whether they are actually open). As another example, the individual fake fingerprints may indicate one or more of: (i) a different operating system than the operating system executing on the asset, (ii) a particular port of the one or more ports is open, whether or not the particular port is actually open, (iii) a different service than the service being provided at the particular port, or (iv) any combination thereof. The operations include sending the one or more fake fingerprints to the scanner in response to the one or more port scans. The operations include determining that a scan engine (e.g., authorized to access the asset for the purpose of identifying potential vulnerabilities) is requesting access to the asset via a particular port of the one or more ports of the asset. The operations include, after authenticating credentials presented by the scan engine, granting the scan engine access to the asset via the particular port. The operations include providing asset data associated with the asset to the scan engine via the particular port. The scanner is associated with a malicious actor and the scan engine is used by an operator of the private network to identify potential vulnerabilities in the private network. Based at least in part on failing to authenticate the credentials presented by the scan engine, the operations may include performing one or more of: (i) disabling the particular port, (ii) denying the scan engine access to the particular port, (iii) raising an alarm indicating an unauthorized attempt to access the particular port, (iv) sending a notification to a system administrator indicating the unauthorized attempt to access the particular port, or (v) any combination thereof. The scan engine analyzes the asset data using artificial intelligence to predict one or more vulnerabilities associated with the one or more ports of the asset.

As a third example, one or more non-transitory computer readable media store instructions executable by one or more processors to perform various operations. The operations include receiving, by an asset in a private network, a request from a scanner. The operations include sending a response to the scanner acknowledging receiving the request. The operations include receiving one or more port scan requests associated with one or more ports of the asset. The one or more port scan requests are sent by the scanner. The operations include creating one or more fake fingerprints. The individual fake fingerprints of the one or more fake fingerprints correspond to individual ports of the one or more ports of the asset. The individual fake fingerprints include incorrect information about individual ports. For example, the fake fingerprint may indicate one or more of: (i) a different operating system than the operating system executing on the asset, (ii) a particular port of the one or more ports is open, regardless of whether the particular port is open or not, (iii) a different service than the service being provided at the particular port, or (iv) any combination thereof. As another example, individual fake fingerprints of the one or more fake fingerprints may indicate that every port of the one or more ports is open. In some cases, the response to the scanner acknowledging receiving the request may indicate that the asset is alive regardless of whether the asset is actually alive. The operations include sending the one or more fake fingerprints to the scanner in response to the one or more port scans. The operations include determining that a scan engine is requesting access to the asset via a particular port of the one or more ports of the asset. After successfully authenticating credentials presented by the scan engine, the operations include granting the scan engine access to the asset via the particular port. The operations include providing asset data associated with the asset to the scan engine via the particular port. The scan engine analyzes the asset data using artificial intelligence to predict one or more vulnerabilities associated with the asset. The scan engine uses a scan template that identifies a scan port associated with individual assets in the private network. The scan engine analyzes the asset data using artificial intelligence to predict one or more vulnerabilities associated with the one or more ports of the asset.

FIG. 1 is a block diagram of a system 100 that includes a computing device of a bad actor scanning an enterprise having multiple assets, according to some embodiments. The system 100 includes a computing device 102 connected to a private network 104 (e.g., an Enterprise network) by one or more networks 106. The computing device 102 is associated with a malicious actor that is attempting to identify and exploit vulnerabilities to gain access to the private network 104. While the computing device 102 is illustrated as being external to the private network 104, in some cases, the computing device 102 may be inside the private network 104. One of the advantages of the systems and techniques described herein is the ability to deter a malicious actor regardless of whether the malicious actor is using a device that is located external to the private network 104 or internal to the private network 104.

The computing device 102 may include a scanner 108, scan results 110, and in some cases, a tar pit detector 112. For example, the scanner may be a network mapping tool such as Nmap. The scanner 108 may send requests 114 to components of the private network 104 and receive responses 116 from the components. The responses 116 may be collected and stored as the scan results 110 and may include fingerprints 111. For example, each of the fingerprints 111 may be determined based on one or more of the responses 116. The systems and techniques described herein provide scan results 110 that are voluminous and that include incorrect information. The voluminous results 110 means that the scanner 108 takes a very long time (e.g., months) to scan the private network 104, (e.g., compared to a network that does not use the systems and techniques that can be scanned in minutes or hours). The tarpit detector may use a tarpit detection protocol that detects a tarpit and stops the scan being performed by the scanner 108. Typically, a tarpit detection protocol is used after the scan, so the malicious actor has to wait for the bad data resulting from the port scan (e.g., in the responses 116) before initiating a tarpit detection protocol. In some cases, the tarpit detection may be performed at a fingerprinting stage. For example, if there are three failed fingerprints in a row, the malicious actor's scanner may assume that the network has a tarpit and stop the scan. The systems and techniques described here do not cause the fingerprinting process to fail, thereby not triggering the tarpit detector. Instead, the systems and techniques provide fake fingerprints that include incorrect data but that appear, to the tarpit detector 112, as being genuine fingerprints. By not triggering the tarpit detector 112, the fake fingerprints result in the scanner 108 continuing to scan the private network 104.

The private network 104 may include multiple assets 118(1) to 118(N) (N>0). The assets 118 may include, for example, a laptop computer, a desktop computer, a server, a router, a switch, another type of device that includes a processor to execute instructions stored in memory and a communications interface capable of communicating with other computing devices, or any combination thereof. Individual assets of the assets 118 may include an obfuscation module 120. For example, the asset 118(1) may include the obfuscation module 120(1) and the asset 118(N) may include the obfuscation module 120(N). Each obfuscation module 120 may include a Tarpit 122, a port spoofer 124, a port shrouding module 126, or any combination thereof. The obfuscation module 120 introduces "noise" that causes a scan, e.g., performed by the scanner 108, to take an excessive amount of time.

Each of the assets 118 may include a software agent 128, such as, for example, Rapid7® Scan Assistant, Insight Agent, or similar. For example, the software agent 128 may periodically gather data associated with the asset 118, such as which ports are open, and store the data as gathered data 130. The software agent 128 may provide the gathered data 130 to a scan engine 142 when the scan engine 142 requests data associated with the asset 118. In this way, the scan engine 142 is able to quickly retrieve the gathered data 130 associated with each of the assets 118 without having to itself gather the data. For example, the software agent 128 may be installed on supported assets, both in the cloud and on-premise, to enable centralized data monitoring on Rapid7®'s Insight platform or similar. The software agent 128 provides endpoint visibility and detection by gathering live system information (e.g., including basic asset identification information, running processes, logs, and the like) from individual assets and sending the gathered data to a platform (e.g., Insight platform) for analysis. Thus, each software agent 128 gathers data associated with the asset on which the software agent 128 is installed. The software agent 128 may perform authenticated scans that utilize elliptic curve asymmetric encryption (ECDSA) and advanced encryption standard (AES) to form a trusted secure channel between the software agent 128 and the Scan Engine 142. The software agent 128 may be deployed with a public certificate in the private network 104 to enable the Scan Engine 142 to receive a private certificate. The software agent 128 may provide the same results as a credential scan without the need for administrative credential management and may provide accurate, granular vulnerability fingerprinting and assessment for each asset. The software agent 128 may enable the Scan Engine 142 to connect directly to an asset to collect data without having to present credentials. For example, a secure connection may be created between the Scan Engine 142 and the software agent 128 by using elliptic curve asymmetric encryption (ECDSA) and advanced encryption standard (AES). In such cases, the scan engine 142 may not provide credentials to obtain gathered data 130 but instead establish a secure connection using ECDSA. The software agent 128 may provide Registry and File System services (when the asset uses a Windows® OS) or a Command Execution Service (when the asset uses a Linux OS) on the local asset.

Each of the assets may include multiple (e.g., 65 k) ports 132. In some cases, one of the ports 132 may be a scan port 134 that is designated for use by the scan engine 142. The scan engine 142 may include a scan template 144 that identifies which port 134 to access on each asset 118 to retrieve the gathered data 130.

Each asset may include an operating system (OS) 140, such as, for example, Microsoft® Windows®, Linux, Apache, Cisco®, or another type of OS. In some cases, the OS 140 may provide a function 138 to obtain about the ports 132 of each asset 118. For example, in the case of Microsoft® Windows® OS, the function 138 may be the netstat command. Of course, other OSs may provide a similar function. In some cases, the scan engine 142 may create a custom function 138 that uses low-level OS calls to obtain the information about the asset 118 that is used by the scan engine 142 to detect vulnerabilities. The function 138 may provide information such as, for example, active TCP connections, ports on which the asset 118 is listening (e.g., also referred to as open or active ports), Ethernet statistics, the internet protocol (IP) routing table, IPv4 statistics (for the IP, Internet Control Message Protocol (ICMP), Transmission Control Protocol (TCP), and User Datagram Protocol (UDP) protocols), IPv6 statistics (for the IPV6, ICMPv6, TCP over IPv6, and UDP over IPv6 protocols), active TCP connections, other types of information about the asset 118, or any combination thereof.

When the scanner 108 sends a SYN request 114 to a particular asset 118, the tarpit 122 of the particular asset 118 provides a SYN-ACK in the response 116 to the SYN request 114. Thus, even if there are a few assets within a particular subnet, all the assets respond with the SYN-ACK and so appear to be active, even though the majority of the assets are not active. If the scanner 108 performs a scan against all the ports 132 (e.g., 65 k ports) of the particular asset 118, all of the ports 132 respond to the requests 114 and appear in the scan results 110 as if all the ports 132 are open, even though a few of the ports 132 may actually be open.

Transmission Control Protocol (TCP) uses a handshake, e.g., a process, to make a connection between two computers (e.g., such as a client and a server). In FIG. 1, the scanner 108 is attempting to create a connection between the computing device 102 and one or more of the assets 118. The handshake process involves the exchange of synchronization (SYN) and acknowledgment (SYN-ACK) packets prior to establishing a connection. SYN is used to initiate and establish a connection. The SYN-ACK message is an acknowledgement (ACK) of the earlier packet (SYN).

Three-way handshake process is designed in such a way that both ends help you to initiate, negotiate, and separate TCP socket connections at the same time. It allows you to transfer multiple TCP socket connections in both directions at the same time.

The port spoofer 124 takes this one step further by providing fake fingerprints 111 in the responses 116 to the requests 114 of the scanner 108. Thus, in addition to the scan results 110 showing that a large number of the ports 132 of individual assets 118 appear to be open ports, the scan results 110 may include fake fingerprints 111 that appear to be real. In this way, during a fingerprint phase, the scanner 108 may attempt to fingerprint all (e.g., 65 k) of the ports 132. Fingerprinting is the hardest and longest process in a scan, which means that fingerprinting thousands of open ports to determine the fingerprints 111 may take months (or even years) to complete. The fingerprints 111 may be used by the malicious actor to identify network protocols, hardware devices, software information, OS type, OS version, simple network management protocol (SNMP) information, domain names, network blocks, virtual private network (VPN) points, and the like.

The port shrouding 126 performs additional obfuscation. For example, each fingerprint provided in response to the requests 114 may appear as though a particular OS (e.g., Microsoft® Windows®) is present on all assets 118 when at least some assets are using another OS (e.g., Linux). In some cases, each of the fingerprints 111 may indicate a first OS is present when a second OS is actually present (e.g., fingerprint shows Windows® when asset runs Linux or fingerprint shows Linux when asset runs Windows®). Thus, using the port spoofer 124 and the port shrouding 126, each asset 118 may respond indicating that the same particular port (e.g., port 139) is open and provide a fingerprint (e.g., in the responses 116) indicating the same particular OS (e.g., a Microsoft® Windows®). In this way, the scan results 110 appear to indicate that all assets are running a particular OS (e.g., Windows®), even when some assets are running a different OS (e.g., Linux, Cisco®, Apple® OS, or the like). Thus, even if the attacker waits for a scan of all the assets 118 or limits the scan to just a few of the assets 118 and a few of the ports 132, the scan results 110 include fake information (e.g., fake fingerprints 111) that makes it difficult for the attacker to mount an attack.

The issue with using the obfuscation module 120 to provide voluminous and incorrect information to the scanner 108 is enabling a legitimate scan tool, such as the scan engine 142, to identify potential vulnerabilities in the private network 104. The systems and techniques described herein use several techniques to enable the scan engine 142 to identify potential vulnerabilities while thwarting attempts by a malicious actor to obtain information about the vulnerabilities of the private network 104.

Individual assets 118 may have a particular port, such as the scan port 134, designated for use by the scan engine 142. The scan port 134 that has been designated for use by the scan engine 142 is stored in the scan template 144. When the scan engine 142 initiates the scan of the assets 118, the scan engine 142 refers to the scan template 144 to determine the scan port 134 with which to access a particular one of the assets 118. The software agent 128 may monitor the scan port 134 for activity. For example, to scan the asset 118(1), the scan engine 142 may refer to the scan template 144, and determine that the scan port 134(1) is to be used to access the asset 118(1). The scan engine 142 may send an access request 152(1) to the scan port 134(1). In response to detecting the access request 152(1), the software agent 128(1) may attempt to create a secure channel using ECDSA or request to authenticate the scan engine 142. In response, the scan engine 142 may create the secure channel or present credentials 154(1). If the software agent 128(1) successfully creates the secure channel with the scan engine or authenticates the credentials 154(1), then the software agent 128(1) may enable the scan engine 142 to access the asset 118(1). After being granted access to the asset 118(1) via the scan port 134(1), the scan engine 142 may retrieve data 156(1) from the asset 118 and store the data 156(1) in data 145. If the software agent 128(1) is unsuccessful in creating the secure channel or authenticating the credentials 154(1), then the software agent 128(1) may raise an alarm, send a notification message (e.g., email, text message, or the like), block/close the scan port 134(1), perform another type of action, or any combination thereof.

After gaining access to the asset 118(1) via the scan port 134(1), the scan engine 142 may obtain the data 156(1) that it uses to identify vulnerabilities in one of several ways. The scan engine 142 may ask the software agent 128 to provide the data 156(1). In some cases, the software agent 128 may provide the gathered data 130(1) as the data 156(1). In other cases, the software agent 128(1) may use the function 138(1) to obtain and provide the data 156(1) to the scan engine 142. Alternately, the scan engine 142 may not involve the software agent 128(1). Instead, the scan engine 142 may directly invoke the function 138(1) to obtain the data 156(1).

After obtaining the data 156(1) from the asset 118(1), the scan engine 142 may move onto the next asset in the assets 118. The scan engine 142 may use the scan port 134 from the scan template 144 to access the next asset. In this way, the scan engine 142 may repeatedly access each of the assets 118 in the private network 104 to determine the data 156 associated with each of the assets 118.

The scan engine 142 may store the data 156 gathered from each of the assets 118 in the data 145. The scan engine 142 may use an artificial intelligence (AI) 146 to analyze the data 145. For example, the AI 146 may be trained using known vulnerabilities (e.g., previously discovered vulnerabilities) and their characteristics to enable the AI 146 to analyze the data 145 and predict vulnerabilities 148 in the private network 104. For example, if a common exploit used by malicious actors involves accessing a particular port, then the AI 146 may analyze the data 145 to determine whether the particular port on one or more of the assets 118 is potentially vulnerable to attack. In some cases, the AI 146 may provide suggestions 154 to address one or more of the vulnerabilities 148. For example, if the AI 146 analyze the data 145 and determines that the particular port on one or more of the assets is potentially vulnerable to attack, then the AI 146 may provide one or more suggestions on how to reduce the possibility of the port being attacked. For example, the suggestion may include moving a service currently offered at the particular port to a different port, changing a protocol used at the port, adding security measures to prevent unauthorized access of the port, another preventative measure, or any combination thereof.

An installer 160 may designate the scan port 134 on each asset 118 and create the scan template. The installer 160 may install the software agent 128 on individual assets 118. The installer 160 may install the scan engine 142 in the private network 104.

Thus, individual assets in a network may use a tarpit, port spoofing, port shrouding, or any combination thereof to provide voluminous and incorrect ("fake") data in response to a recon scan performed by a malicious actor, making it difficult for the malicious actor to obtain useful vulnerability information. A software agent (e.g., Rapid7® Scan Assistant, Insight agent, or similar) may be installed on each asset (e.g., a computer, a router, a switch, or the like) in the network. A port on each asset may be designated for use by an authorized scan engine (e.g., Rapid7® InsightVM or similar). The authorized scan engine uses a scan template that includes the designated port on each asset to scan the network and obtain data that is analyzed to identify potential vulnerabilities. In this way, an authorized scan engine is able to obtain asset data that the scan engine may analyze to identify potential vulnerabilities while unauthorized recon scans by malicious actors obtain voluminous and incorrect information that does not help the malicious actors identify and exploit potential vulnerabilities.

Figure 2:
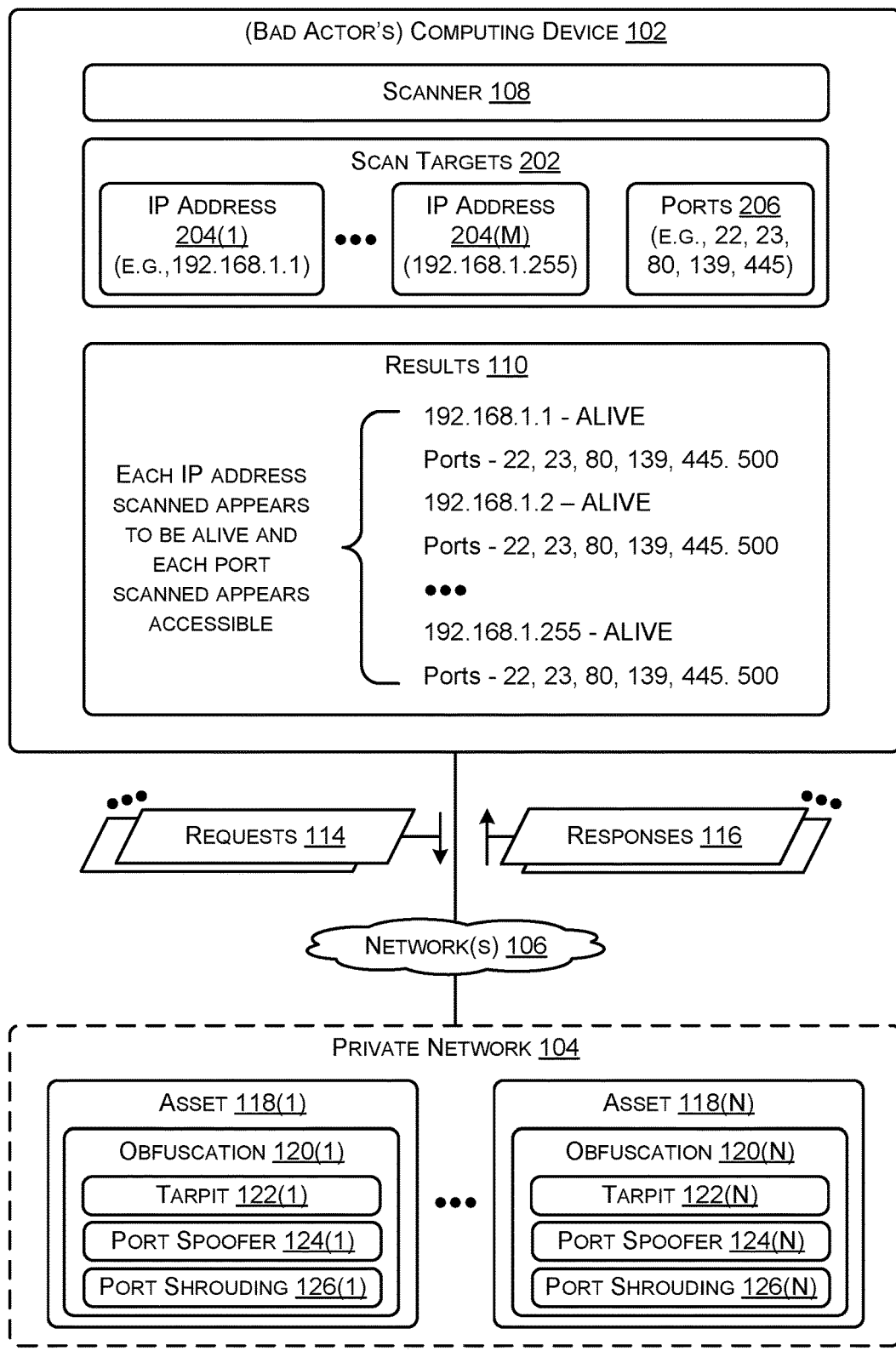
FIG. 2 is a block diagram of a system that includes results received from a tarpit in response to a scan, according to some embodiments.

FIG. 2 is a block diagram of a system 200 that includes results received from a tarpit in response to a scan, according to some embodiments. The scanner 108 may be provided scan targets 202 that include a range of IP addresses to scan, e.g., from IP address 204(1) to IP address 204(M) (M>0), such as from 192.168.1.1 to 192.168.1.255. The scan targets 202 may include a set of ports to scan, such as ports 22, 23, 80, 139, and 445 (e.g., ports known to be easier to access because they are typically configured to provide specific services). The Tarpit 122 may respond by indicating in the responses 116 that each of the 256 IP addresses are alive and that each of the ports 22, 23, 80, 139, 445 on each of the 256 assets are alive. In this way, the malicious actor is not provided any useful information because all of the ports that are scan targets on all 256 of the IP addresses appear to be alive. Thus, the malicious actor is not able to narrow down the list of IP addresses to a smaller number.

Thus, a tarpit function on each asset in a network may generate data showing that all IP addresses and all ports that are scanned are alive, even if some of them are not. This provides two advantages. First, the scan takes a long time because each IP address and each port scanned on each IP address provides a response. Second, the recon scan does not provide a malicious actor with useful information, thereby preventing the malicious actor from identifying and exploiting a vulnerability to gain access to one or more of the assets that were scanned.

Figure 3:
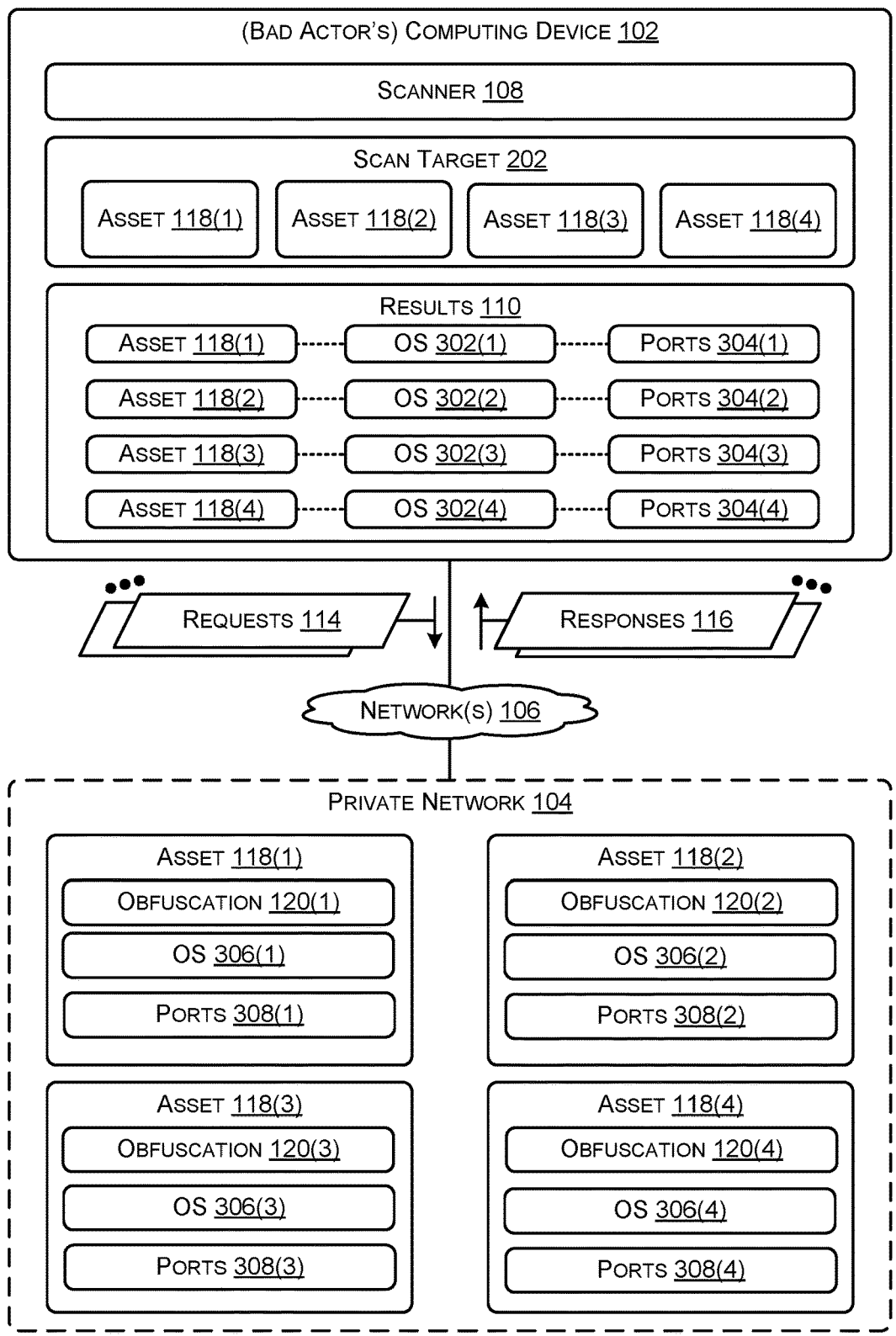
FIG. 3 is a block diagram of a system that includes results received from providing fake fingerprints in response to a scan, according to some embodiments.

FIG. 3 is a block diagram of a system 300 that includes results received from providing fake fingerprints in response to a scan, according to some embodiments. The malicious actor may provide the scanner 108 with multiple scan targets 202, such as the assets 118(1), 118(2), 118(3), 118(4). The obfuscation module 120 may provide incorrect information in the responses 116. For example, the results 110 may indicate, based on the responses 116, that asset 118(1) has an OS 302(1), and open ports 304(1), asset 118(2) has an OS 302(2), and open ports 304(2), asset 118(3) has an OS 302(3), and open ports 304(3), asset 118(4) has an OS 302(4), and open ports 304(4).

In actuality, the asset 118(1) may have an OS 306(1) and open ports 308(1), the asset 118(2) may have an OS 306(2) and open ports 308(2), the asset 118(3) may have an OS 306(3) and open ports 308(3), the asset 118(4) may have an OS 306(4) and open ports 308(4). In this example, the OS 302(1) that appears in the results 110 may not be the same as the OS 306(1) that actually executes on the asset 118(1), and the open ports 304(1) in the results 110 may not be the same as the actual open ports 308(1) on the asset 118(1). The OS 302(2) that appears in the results 110 may not be the same as the OS 306(2) that actually executes on the asset 118(2), and the open ports 304(2) may not be the same as the actual open ports 308(2) on the asset 118(2). The OS 302(3) that appears in the results 110 may not be the same as the OS 306(3) that actually executes on the asset 118(3), and the open ports 304(3) may not be the same as the actual open ports 308(3) on the asset 118(3). The OS 302(4) that appears in the results 110 may not be the same as the OS 306(4) that actually executes on the asset 118(4), and the open ports 304(4) may not be the same as the actual open ports 308(4) on the asset 118(4). In this way, the results 110 include obfuscated data that does not accurately reflect the assets 118. A malicious actor thinking that a particular asset has a particular OS and a particular set of open ports will select a specific attack based on the particular OS and the particular set of open ports and be stymied when the specific attack fails because the particular asset has a different OS and a different set of open ports.

Thus, providing fake fingerprints, that appear real, in response to a scan provides incorrect information to a malicious actor. In this way, the results of a recon scan do not provide the malicious actor with useful information, thereby preventing the malicious actor from identifying and exploiting a vulnerability to gain access to one or more of the assets that were scanned.

In the flow diagrams of FIGS. 4, 5, 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, 600, 700, and 800 are described with reference to FIGS. 1, 2, and 3 as described above, although other models, frameworks, systems and environments may be used to implement these processes.

Figure 4:
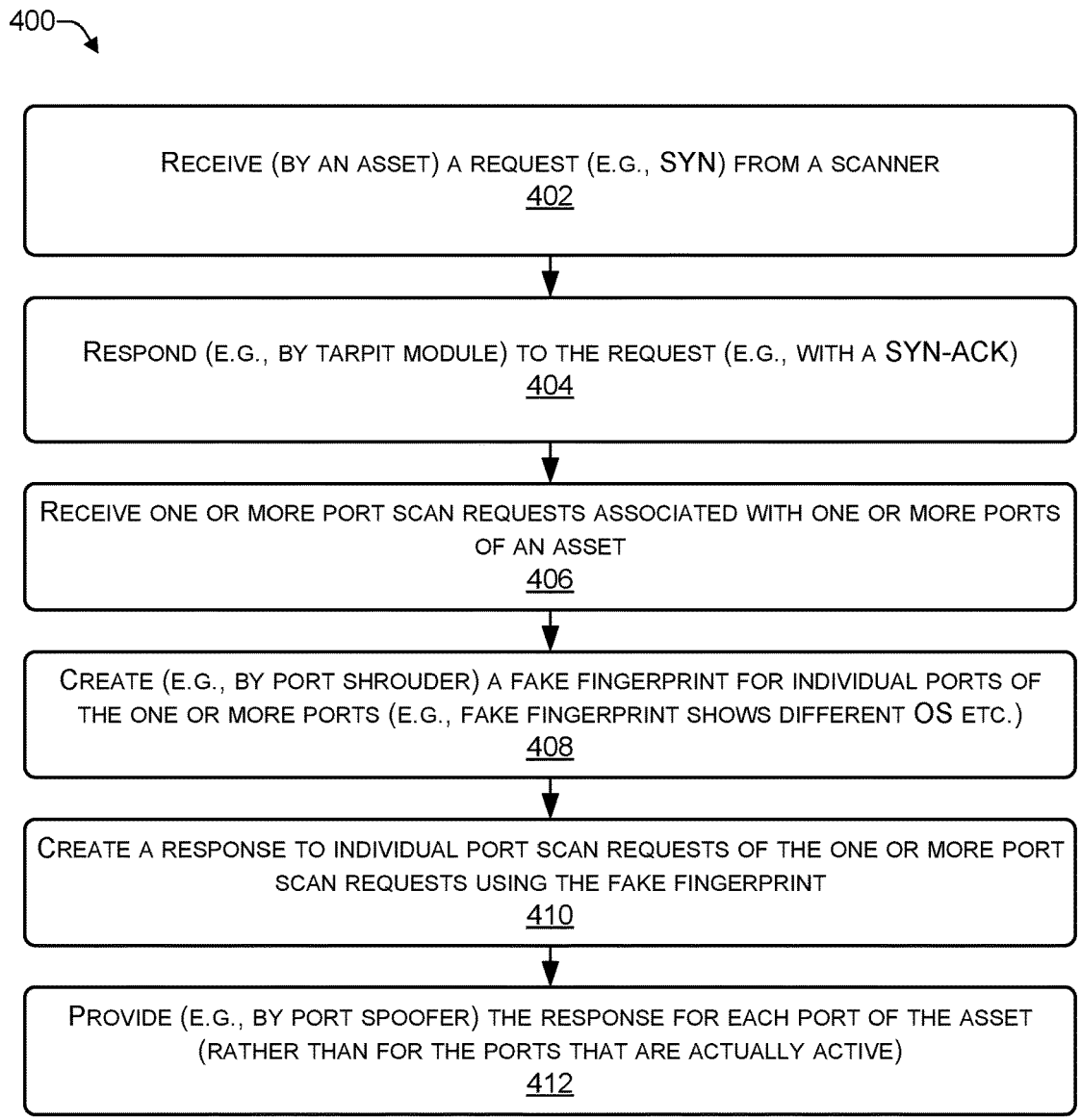
FIG. 4 is a flowchart of a process that includes providing obfuscated information in response to a scan request, according to some embodiments.

FIG. 4 is a flowchart of a process 400 that includes providing obfuscated information in response to a scan request, according to some embodiments. The process 400 may be performed by one or more components of the obfuscation module 120 of FIGS. 1, 2, and 3.

At 402, the process may determine that an asset received a scan (e.g., SYN) request from a scanner. At 404, the process (e.g., a tarpit module) may respond to the SYN request with a SYN-ACK. At 406, the process may receive one or more port scan request associated with one or more ports of an asset. At 408, the process may create (e.g., by a port shrouder) a fake fingerprint (e.g., showing a different OS than is actually present) for individual ports of the one or more ports of the asset. At 410, the process may create a response to individual port scan requests of the one or more port scan requests using the fake fingerprint. At 412, the process may provide the response for each port of the asset (e.g., rather than for the ports that are actually active). For example, in FIG. 1, the obfuscation module 120 may determine that the asset 118 has received one of the requests 114 from the scanner 108. In response, the obfuscation module 120 may respond to the request by indicating that the IP address associated with the asset 118 is active. The port spoofer 124 may respond to a port scan request (of the request 114) by indicating that the port is alive (regardless of whether the port is actually alive or not). The port shrouding 126 may provide a fake fingerprint indicating that a particular OS is present on the asset 118 (regardless of whether the OS is actually present or whether a different OS is present).

Thus, when a malicious actor performs a recon scan of assets in a network, an obfuscation module on each asset responds to requests performed as part of the recon scan by (1) indicating that every IP address that is scanned appears active, (2) indicating that every port that is scanned appears alive, (3) providing a fake fingerprint that appears real but includes false information, such as which OS is running, or (4) any combination thereof. The advantages of performing such obfuscation includes causing the scan to take a very long time and providing the malicious actor with information that is not useful in identifying potential vulnerabilities in the network.

Figure 5:
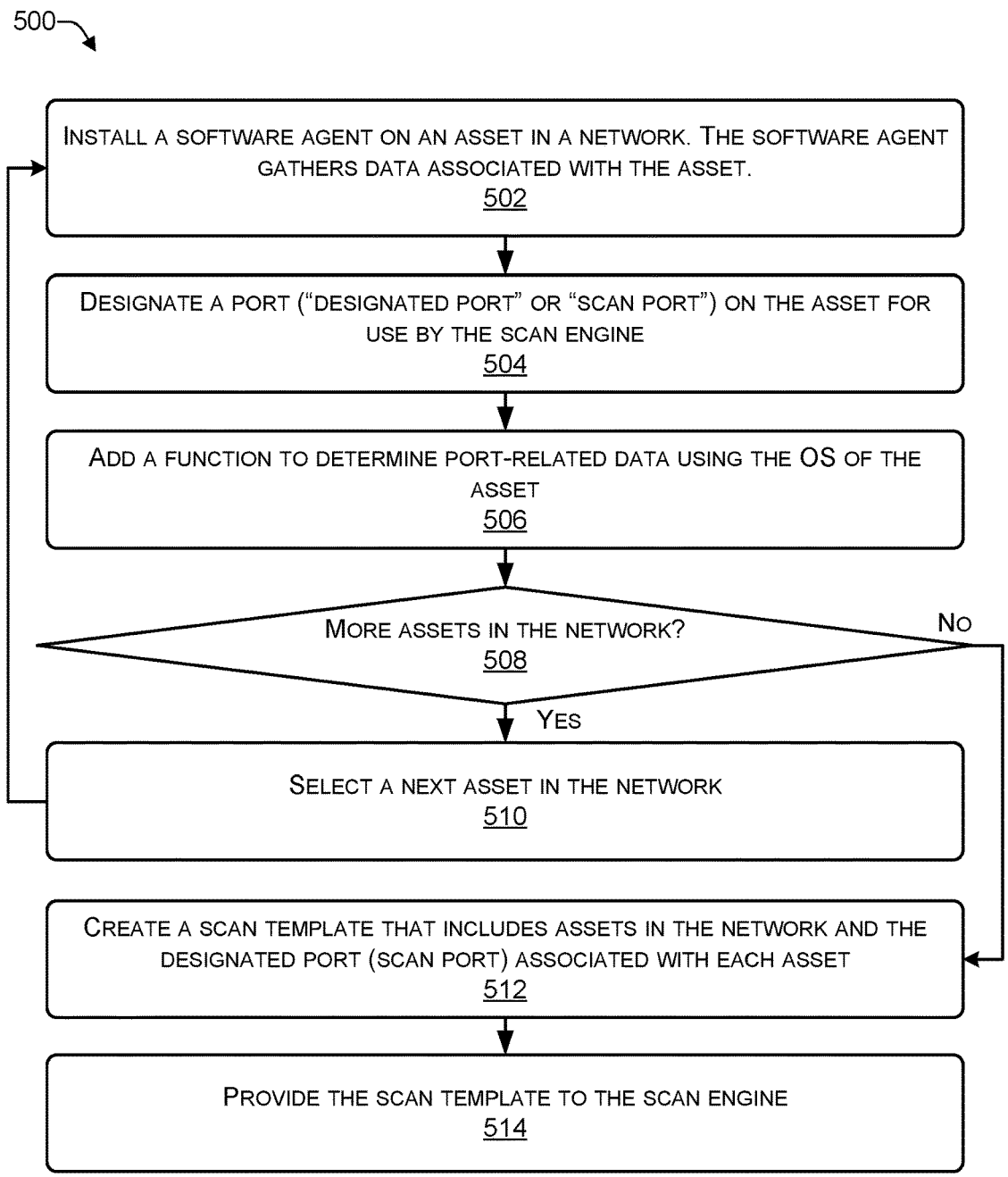
FIG. 5 is a flowchart of a process that includes creating a scan template that identifies ports designated for use by a scan engine, according to some embodiments.

FIG. 5 is a flowchart of a process 500 that includes creating a scan template that identifies ports designated for use by a scan engine, according to some embodiments. The process 500 is performed by the installer 160 of FIG. 1 that may be used to install: (1) the software agents 128, (2) the scan engine 142, or (3) both.

At 502, the process may install the software agent (e.g., scan assistant, insight agent, or the like) on an asset in a network. At 504, the process may designate a port ("designated port" or "scan port") on the asset for use by the scan engine. At 506, the process may add a function call (e.g., netstat or similar) to determine port-related data using the operating system of the asset. At 508, the process may make a determination whether or more assets in the network. If the process determines, at 508, that "yes" there are more assets in the network on which to install the software agent, then the process may select a next asset in the network, at 510, and proceed to 502. At 502, the process may install a software agent on the next asset. If the process determines, at 508, that "no" there are no more assets in the network on which to install the software agent, then the process may proceed to 512, where the process creates a scan template that includes assets in the network and the designated port associated with each asset. At 514, the process may provide the scan template to the scan engine. For example, in FIG. 1, the installer 160 may install the software agent 128 on individual assets 118. The installer 160 may designate a port, such as the scan port 134 of the ports 132, for use by the scan engine 142. In some cases, the installer 160 may create a function, such as the function 138 (e.g., a script or an executable command), that uses low-level calls of the OS 140 to provide information associated with the asset 118 (including information about the ports 132) to the scan engine 142. The function 138 may provide information similar to the netstat command in Windows®. After the installer 160 determines that the software agent 128 has been installed on individual assets 118 in the private network 104, the installer 160 may create the scan template 144 that identifies the scan port 134 associated with each of the assets 118.

By accessing individual assets 118 using the scan port 134, the scan engine 142 is able to bypass using a scan that would have resulted in the scan engine 140 receiving obfuscated data from the obfuscation module 120 about each of the assets 118. The advantages are that, the scan engine 142 is able to gather data and identify potential vulnerabilities in the private network 104 while the scanner 108 is unable to obtain useful information to identify potential vulnerabilities.

Figure 6:
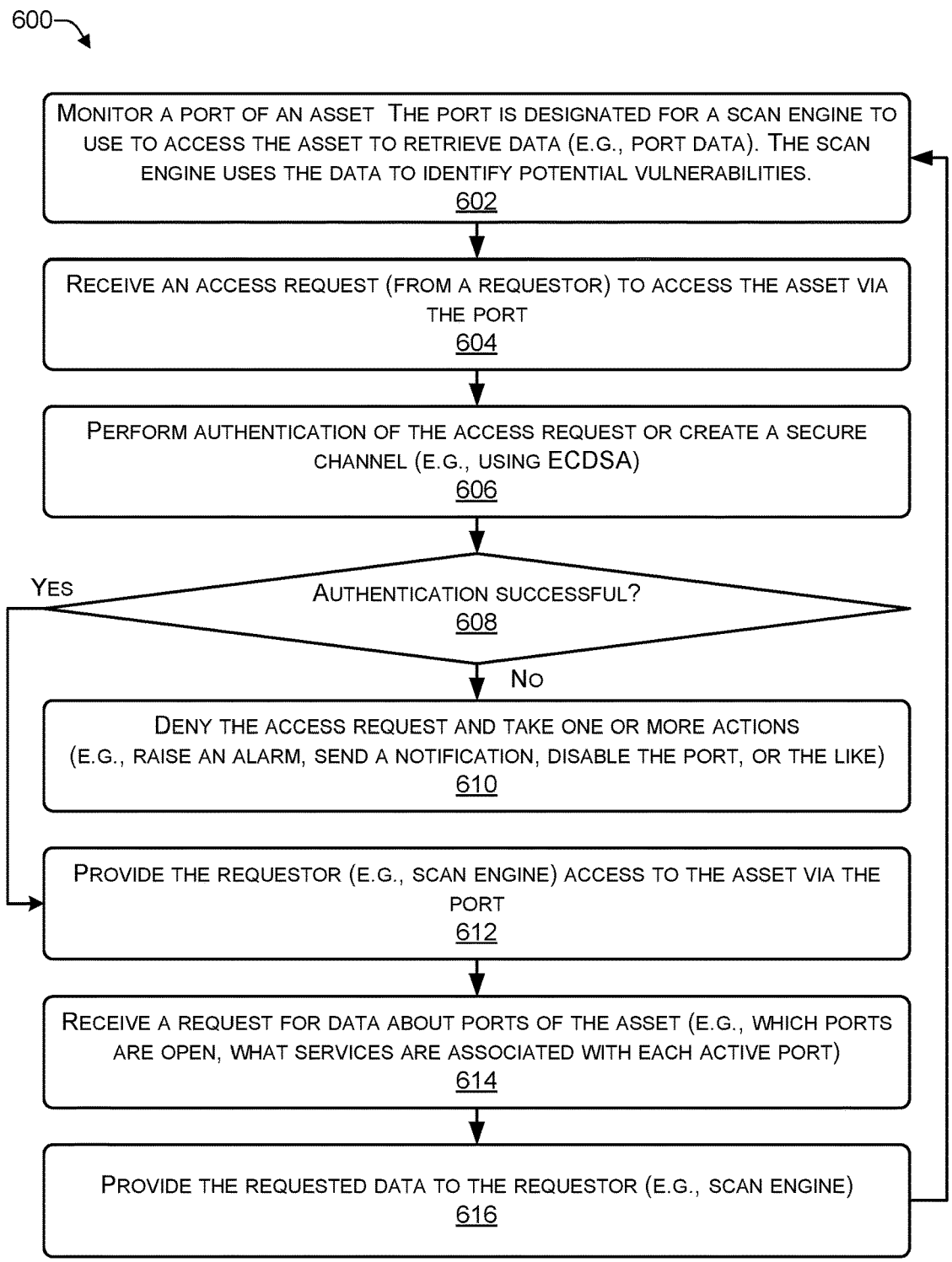
FIG. 6 is a flowchart of a process that includes a scan engine attempting to access an asset in a network, according to some embodiments.

FIG. 6 is a flowchart of a process 600 that includes a scan engine attempting to access an asset in a network, according to some embodiments. The software 600 is performed by the software agent 128 of FIG. 1.

At 602, the process may monitor a port of an asset. The port is designated for use by a scan engine to access the asset to retrieve data (e.g., port data). The scan engine uses the data to identify potential vulnerabilities. At 604, the process may receive an access request from a requestor to access the asset via the port. At 606, the process may perform an authentication of the access quest (e.g., by authenticating credentials of the requestor) or by creating a secure channel (e.g., tunnel) using ECDSA. At 608, the process determines whether the authentication was successful. If the process determines, at 608, that "no" the authentication was not successful, then the process may proceed to 610 and deny the access request. In some cases, the process may take one or more actions, such as raising an alarm, sending a notification (e.g., text or email) to a system administrator, disabling the port, or the like. If the process determines, at 608, that "yes" the authentication was successful, then the process may proceed to 612. At 612, the process may provide the requester (e.g., the scan engine) access to the asset via the port. At 614, the process may receive a request for data about ports of the asset (e.g., which ports are open, what services associated with each active port, or other port-related information). At 616, the process may provide the requested data to the requestor (e.g., the scan engine) and proceed back to 602, where the process monitors the port of the asset.

For example, in FIG. 1, the software agent 128 may monitor the scan port 134 which has been designated for use by the scan engine 142. The software agent 128 may receive, via the scan port 134, an access request 152. The software agent 128 may create a secure channel with the scan engine 142 using ECDSA or the scan engine 142 may present credentials 154. The software agent 128 attempts to authenticate the credentials 154 (or authenticate the requestor in another way) or create the trusted secure channel using ECDSA. If the software agent 128 is able to successfully create the secure channel or successfully authenticate the credentials 154, then the software agent 128 may enable the requestor (e.g., scan engine 142) to access the asset 118 via the scan port 134. For example, the scan engine 142 may use the function 138 to retrieve (for analysis) the data 156 associated with the asset 118. If the software agent is unable to successfully create the secure channel or authenticate the credentials 154, then the software agent 128 may perform one or more actions, such as raising an alarm, notifying a system administrator, disabling the scan port 134, or the like.

Figure 7:
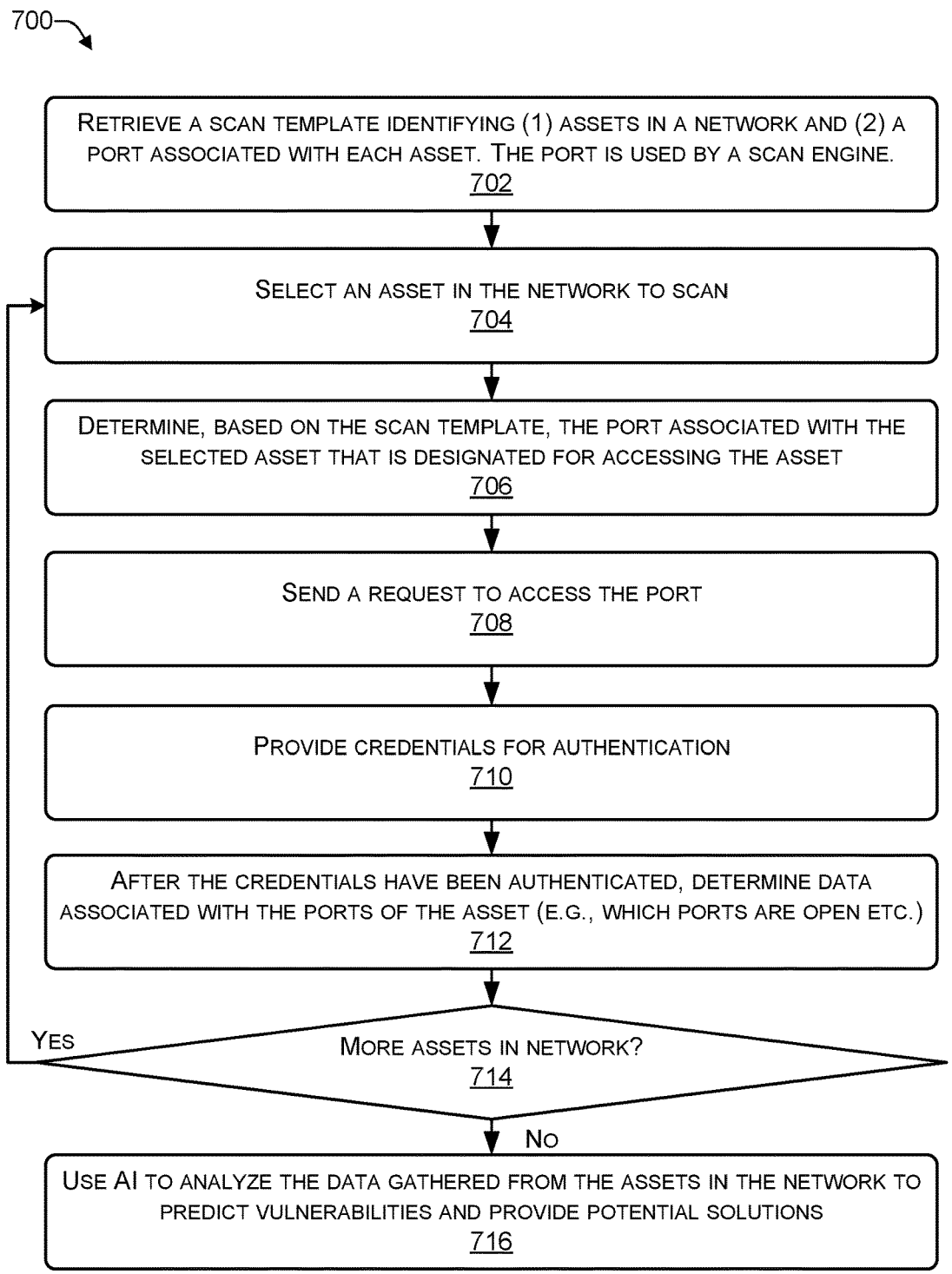
FIG. 7 is a flowchart of a process that includes using a scan template to scan assets in a network, according to some embodiments.

FIG. 7 is a flowchart of a process 700 that includes using a scan template to scan assets in a network, according to some embodiments. The process 700 may be performed by the scan engine 142 of FIG. 1.

At 702, the process may retrieve a scan template identifying assets in a network and identifying a port associated with each asset. The port is designated for use by the scan engine. At 704, the process may select an asset in the network to scan. At 706, the process may determine, based on the scan template, the port associated with the selected asset that is designated for the scan engine. At 708, the process may send a request to access the port. At 710, the process may provide credentials for authentication. At 712, after the credentials have been authenticated, the process may determine data (e.g., which ports are open and the like) associated with the ports of the asset. At 714, the process may determine whether there are more assets to be scanned in the network. If the process determines, at 714, that "yes" there are more assets in the network to be scanned, then the process proceeds to 704 to select another asset in the network scan. If the process determines, at 714, that "no" there are no more assets in the network to be scanned, then the process proceeds to 716. At 716, the process uses artificial intelligence (AI) to analyze the data gathered from the assets in the network to predict vulnerabilities and provide potential solutions to one or more of the predicted vulnerabilities. For example, in FIG. 1, the scan engine 142 may access the scan template 144 before performing a scan of the assets 118 in the private network 104. After selecting an asset, such as the asset 118(1), the scan engine 142 may determine the scan port 134(1) based on the scan template 144 and send the access request 152 via the scan port 134(1). The scan engine 142 may provide credentials 154(1) for authentication. After the credentials 154(1) have been authenticated, the scan engine 142 may determine and transfer the data 156(1) associated with the asset 118(1), such as, for example, which of the ports 132(1) are open, which services are being offered at the open ports, and the like. For example, the scan engine 142 may ask the software agent 128(1) or use the function 138(1) (e.g., that provides results similar to the Windows command netstat) to obtain the data 156(1). The scan engine 142 stores the data 156(1) with data 145 that is been gathered from other assets in the private network 104. The scan engine 142 determines, using the scan template 144, whether there is another asset in the network 104 from which to obtain data. If there is another asset, then the scan engine 142 selects the next asset and uses a scan template 144 to determine the scan port associated with the next asset to determine the data 156. If the scan engine 142 determines, based on the scan template 144, that there are no more assets in the network 104 to be scanned, then the scan engine 142 uses the AI 146 to analyze the data to predict the vulnerabilities 148 and provide suggestions 150 on addressing one or more of the vulnerabilities 148. For example, the AI 146 may be trained using known vulnerabilities and how they are exploited. In this way, the AI 146 is able to identify similar conditions in the data 145 that have the potential to be exploited. In some cases, the AI 146 may order the vulnerabilities 148 according to the severity of the vulnerabilities 148, the ease with which an exploit can be used, or using other criteria. For example, the AI 146 may identify the vulnerabilities 148 that have a high probability of being exploited because they similar to other known vulnerabilities.

Thus, a scan engine may gain access to individual assets in a private network by providing credentials that are authenticated by a software agent (or other entity) executing on the individual assets. After being authenticated, the scan engine may gather data about the asset by asking a software agent or by calling a function (either built into the operating system or created and placed on the asset). The scan engine may gather data from individual assets in the private network and perform an analysis of the gathered data using AI to predict vulnerabilities. In some cases, the AI may provide suggestions to address the vulnerabilities. In this way, an authorized scan engine used by a system administrator to identify potential vulnerabilities is able to continue to coexist with an obfuscation module that provides voluminous and incorrect data in response to a scan performed by an unauthorized scanner.

Figure 8:
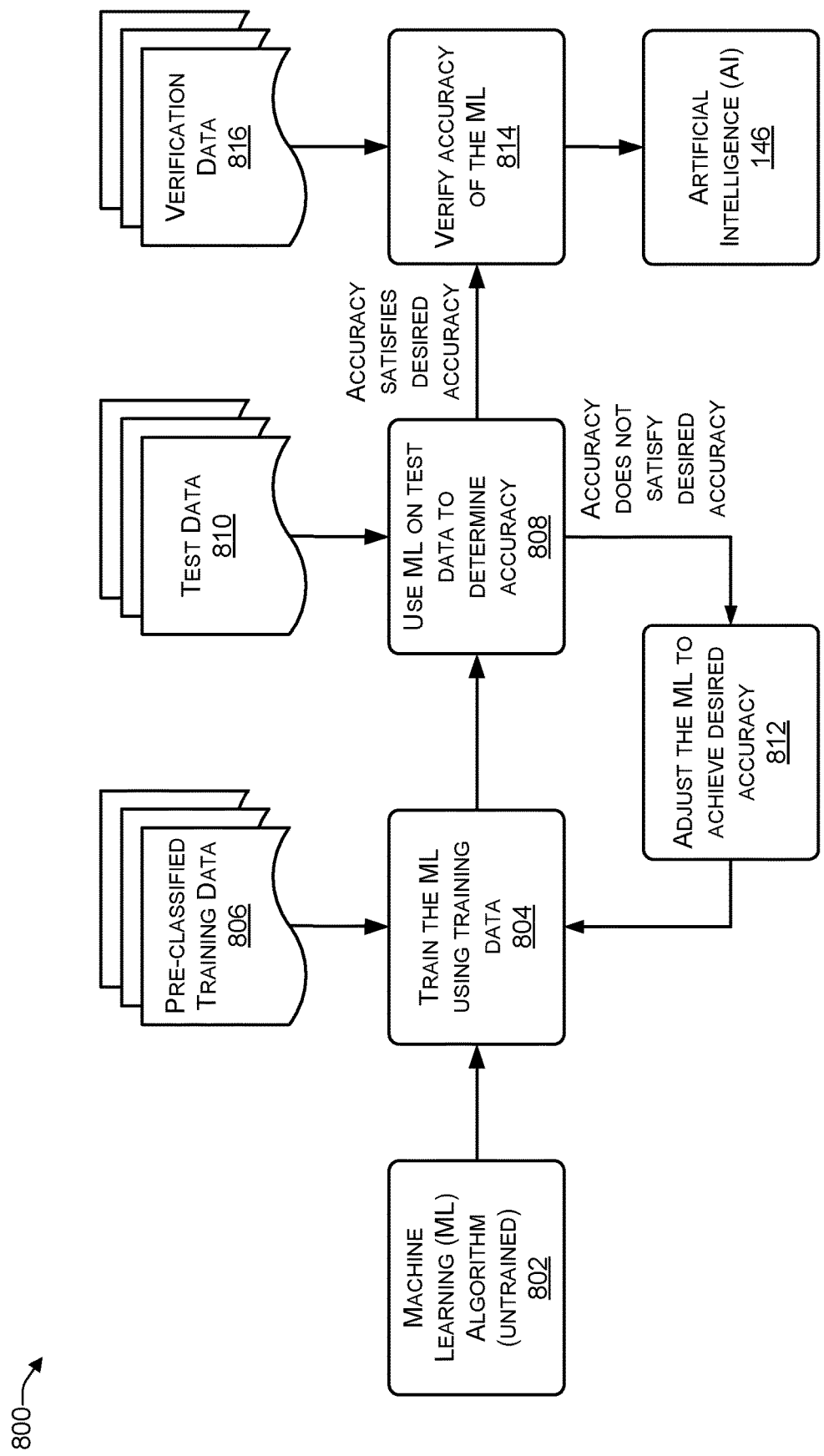
FIG. 8 is a flowchart of a process that includes training a machine learning algorithm to create an artificial intelligence (AI), according to some embodiments.

FIG. 8 is a flowchart of a process 800 that includes training a machine learning algorithm to create an artificial intelligence (AI), according to some embodiments. For example, the process 800 may be performed by one of the assets 118 of FIG. 1.

At 802, a machine learning algorithm (e.g., software code that has not yet been trained) may be created by one or more software designers. At 804, the machine learning algorithm may be trained using pre-classified training data 806 (e.g., vulnerabilities, characteristics of the vulnerabilities, solutions, and the like). For example, the training data 806 may have been pre-classified by humans, by machine learning, or a combination of both. After the machine learning has been trained using the pre-classified training data 806, the machine learning may be tested, at 808, using test data 810 to determine an accuracy of the machine learning. For example, in the case of a classifier, the accuracy of the classification may be determined using the test data 810.

If an accuracy of the machine learning does not satisfy a desired accuracy (e.g., 95%, 98%, 99% accurate), at 808, then the machine learning code may be modified (e.g., adjusted), at 812, to achieve the desired accuracy. For example, at 812, the software designers may modify the machine learning software code to improve the accuracy of the machine learning algorithm. After the machine learning has been tuned, at 812, the machine learning may be retrained, at 804, using the pre-classified training data 806. In this way, 804, 808, 812 may be repeated until the machine learning is able to classify the test data 810 with the desired accuracy.

After determining, at 808, that an accuracy of the machine learning satisfies the desired accuracy, the process may proceed to 814, where verification data 816 may be used to verify an accuracy of the machine learning. After the accuracy of the machine learning is verified, at 814, the artificial intelligence 119, which has been trained to provide a particular level of accuracy may be used. For example, the AI 146 may be trained to detect vulnerabilities in assets, determine (based on the vulnerabilities) a risk score for each externally exposed asset, provide one or suggestions on addressing the vulnerabilities and reducing the risk, or any combination thereof. The AI 146 may be a support vector machine, an unsupervised clustering algorithm, an artificial neural network algorithm, or another type of artificial intelligence.

Figure 9:
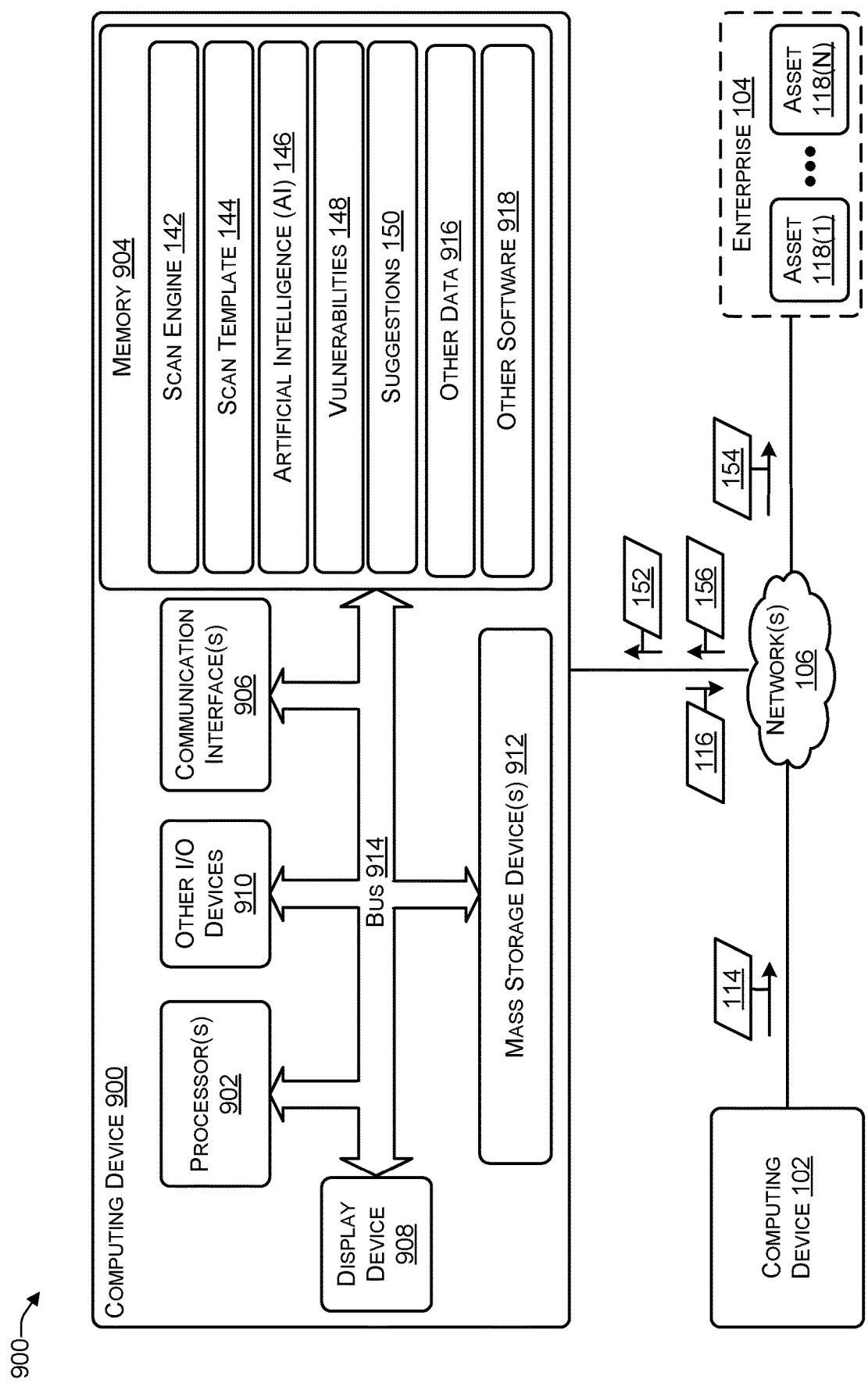
FIG. 9 illustrates an example configuration of a computing device that can be used to implement the systems and techniques described herein.

FIG. 9 illustrates an example configuration of a computing device 900 that can be used to implement the systems and techniques described herein, such as individual assets 118 and the scan engine 142 of FIG. 1.

The computing device 900 may include one or more processors 902 (e.g., central processing unit (CPU), graphics processing unit (GPU), or the like), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 902 are one or more hardware devices that may include a single processing unit or multiple processing units, all of which may include single or multiple computing units or multiple cores. The processors 902 may include a GPU that is integrated into the CPU or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 are configured to fetch and execute computer-readable instructions stored in the memory 904, mass storage devices 912, and other types of non-transitory computer-readable media.

Memory 904 and mass storage devices 912 are examples of non-transitory computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 904 and mass storage devices 912 may be collectively referred to as memory or computer storage media herein and include any type of non-transitory media capable of storing computer-readable, processor-executable program instructions as computer program code that can be executed by the processors 902 as a particular machine configured for carrying out the operations and functions described in the implementations herein.

The computing device 900 may include one or more communication interfaces 906 for exchanging data via the network(s) 106. The communication interfaces 906 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data. For example, the computer storage media may be used to store the scan engine 142, the scan template 144, the AI 146, the predicted vulnerabilities 148, the suggestions 150, other data 916, and other software 918.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors of an asset in a private network, a request from a scanner;
   sending, by the one or more processors, a response to the scanner acknowledging receiving the request;
   receiving, by the one or more processors, one or more port scan requests associated with one or more ports of the asset, the one or more port scan requests sent by the scanner;
   creating, by the one or more processors, one or more fake fingerprints, wherein individual fake fingerprints of the one or more fake fingerprints correspond to individual ports of the one or more ports of the asset, the individual fake fingerprints including incorrect information about individual ports;
   sending, by the one or more processors, the one or more fake fingerprints to the scanner in response to the one or more port scan requests;
   determining, by the one or more processors, that a scan engine is requesting access to the asset via a particular port of the one or more ports of the asset;
   granting the scan engine access to the asset via the particular port; and
   providing, by the one or more processors, asset data associated with the asset to the scan engine via the particular port.

2. The method of claim 1, wherein the asset comprises one of:
   a computing device;
   a server;
   a network switch;
   a router; or
   any combination thereof.

3. The method of claim 1, wherein:
   the request comprises a SYN request; and
   the response comprises a SYN-ACK.

4. The method of claim 1, wherein individual fake fingerprints indicate:
   a different operating system than an operating system executing on the asset;
   a particular port of the one or more ports is open, regardless of whether the particular port is open or not;
   a different service than a service being provided at the particular port; or
   any combination thereof.

5. The method of claim 1, wherein:
   the scan engine analyzes the asset data using artificial intelligence to predict one or more vulnerabilities associated with the asset.

6. The method of claim 5, wherein the artificial intelligence comprises one of:
   a support vector machine;
   an unsupervised clustering algorithm; or
   an artificial neural network algorithm.

7. The method of claim 1, wherein granting the scan engine access to the asset via the particular port comprises one of:
   authenticating credentials presented by the scan engine; or
   creating a trusted secure channel with the scan engine using elliptic curve asymmetric encryption (ECDSA) and advanced encryption standard (AES).

8. An asset comprising:
   one or more processors; and
   one or more non-transitory computer readable media storing instructions executable by the one or more processors to perform operations comprising:
      receiving a request from a scanner, the asset located in a private network;
      sending a response to the scanner acknowledging receiving the request;
      receiving one or more port scan requests associated with one or more ports of the asset, the one or more port scan requests sent by the scanner;
      creating one or more fake fingerprints, wherein individual fake fingerprints of the one or more fake fingerprints correspond to individual ports of the one or more ports of the asset, the individual fake fingerprints including incorrect information about individual ports;
      sending the one or more fake fingerprints to the scanner in response to the one or more port scan requests;
      determining, by the asset, that a scan engine is requesting access to the asset via a particular port of the one or more ports of the asset;
      granting access to the asset via the particular port; and
      providing asset data associated with the asset to the scan engine via the particular port.

9. The asset of claim 8, wherein:
   the scanner is associated with a malicious actor; and
   the scan engine is used by an operator of the private network to identify potential vulnerabilities in the private network.

10. The asset of claim 8, wherein:
    individual fake fingerprints of the one or more fake fingerprints indicate that every port of the one or more ports is open.

11. The asset of claim 8, wherein:
    the response to the scanner acknowledging receiving the request indicates that the asset is alive regardless of whether the asset is actually alive.

12. The asset of claim 8, wherein individual fake fingerprints indicate one or more of:
    a different operating system than an operating system executing on the asset;
    a particular port of the one or more ports is open, whether or not the particular port is actually open;
    a different service than a service being provided at the particular port; or
    any combination thereof.

13. The asset of claim 8, wherein:
    based at least in part on failing to authenticate the credentials presented by the scan engine, performing one or more of:
       disabling the particular port;
       denying the scan engine access to the particular port;
       raising an alarm indicating an unauthorized attempt to access the particular port;
       sending a notification to a system administrator indicating the unauthorized attempt to access the particular port; or
       any combination thereof.

14. The asset of claim 8, wherein granting the scan engine access to the asset via the particular port comprises one of:
    authenticating credentials presented by the scan engine; or
    creating a trusted secure channel with the scan engine using elliptic curve asymmetric encryption (ECDSA) and advanced encryption standard (AES).

15. One or more non-transitory computer readable media storing instructions executable by one or more processors to perform operations comprising:
    receiving, by an asset in a private network, a request from a scanner;
    sending, by the asset, a response to the scanner acknowledging receiving the request;
    receiving, by the asset, one or more port scan requests associated with one or more ports of the asset, the one or more port scan requests sent by the scanner;
    creating, by the asset, one or more fake fingerprints, wherein individual fake fingerprints of the one or more fake fingerprints correspond to individual ports of the one or more ports of the asset, the individual fake fingerprints including incorrect information about individual ports;
    sending, by the asset, the one or more fake fingerprints to the scanner in response to the one or more port scan requests;
    determining, by the asset, that a scan engine is requesting access to the asset via a particular port of the one or more ports of the asset;
    granting, by the asset, the scan engine access to the asset via the particular port; and
    providing, by the asset, asset data associated with the asset to the scan engine via the particular port.

16. The one or more non-transitory computer readable media of claim 15, wherein individual fake fingerprints indicate:
    a different operating system than an operating system executing on the asset;
    a particular port of the one or more ports is open, regardless of whether the particular port is open or not;
    a different service than a service being provided at the particular port; or
    any combination thereof.

17. The one or more non-transitory computer readable media of claim 15, wherein:
    the scan engine analyzes the asset data using artificial intelligence to predict one or more vulnerabilities associated with the asset.

18. The one or more non-transitory computer readable media of claim 15, wherein:
    the scan engine uses a scan template that identifies a scan port associated with individual assets in the private network.

19. The one or more non-transitory computer readable media of claim 15, wherein:
    individual fake fingerprints of the one or more fake fingerprints indicate that every port of the one or more ports is open; and
    the response to the scanner acknowledging receiving the request indicates that the asset is alive regardless of whether the asset is actually alive.

20. The one or more non-transitory computer readable media of claim 15, wherein granting the scan engine access to the asset via the particular port comprises one of:
    authenticating credentials presented by the scan engine; or creating a trusted secure channel with the scan engine using elliptic curve asymmetric encryption (ECDSA) and advanced encryption standard (AES).

* * * * *